Patented Aug. 2, 1932

1,869,952

UNITED STATES PATENT OFFICE

DAVID L. ANDERSON, OF BALTIMORE, MARYLAND, ASSIGNOR, BY MESNE ASSIGN-
MENTS, TO THE OBERPHOS COMPANY, OF BALTIMORE, MARYLAND, A CORPORATION
OF MARYLAND

PROCESS OF PREPARING PHOSPHATIC FERTILIZER

No Drawing.    Application filed September 19, 1929. Serial No. 393,853.

This invention relates to the production of fertilizers, and more particularly to a process of preparing phosphatic fertilizers.

The usual method of preparing phosphatic fertilizers comprises mixing ground phosphatic rock and sulphuric acid and then discharging the product of the mixing to a den. The mass is allowed to remain in the den for a predetermined period of time, usually for about twenty-four hours, during which the reactions continue with the ultimate formation of some available phosphate salts. The process of preparing double superphosphate is substantially similar to that of preparing superphosphate, involving in most cases, the preliminary treatment of phosphate rock with dilute sulphuric acid and the separation of the phosphoric acid from the solid reaction product. The phosphoric acid thus produced is used to acidulate phosphate rock.

The den product, while containing an amount of available phosphate salts, is, however, in a damp condition due to the presence of excess water and some free acid. This material, while apparently dry, gums or plasticizes very readily with even slight handling. It is customary therefore to dust the den product with absorbents, such as finely ground phosphate rock, so as to reduce this tendency to plasticize and permit transportation to the curing shed. After the material has been deposited in the curing shed, it is the usual practice to turn it over or remill it at intervals, so as to permit aeration and resultant drying. Such protracted methods of treatment to procure an ultimate dry product, involving as they do, considerable rehandling of the material, are decidedly uneconomical.

It is an object of the present invention to greatly reduce the time required to prepare a marketable fertilizer product. Another object is to decrease production costs of fertilizers by adapting certain apparatus to the performance of several steps in the process.

Yet another object is to devise a process of preparing a dry fertilizer product, while substantially eliminating the storage period.

A further object is to provide an improved method of drying phosphatic fertilizer.

It has been found, as explained in copending applications Serial No. 179,706 filed March 30, 1927 and Serial No. 304,789 filed September 8, 1928, that a desirable fertilizer product may be obtained in a very short period of time by reacting finely divided phosphatic material with an acidulating agent in a confined space and under controlled conditions of temperature and pressure. In such a process, by the regulating of temperature and pressure, and the maintenance of the components within a confined space, a well crystallized product of high acidulation and availability is procured.

In each of the applications above referred to, a method of drying the material by utilizing the combination of heat and reversed pressure or vacuum is described. It is with this part of the general process that the present invention is more particularly concerned.

In carrying out the present process, ground phosphate rock and an acid, such as sulphuric or phosphoric acid may be admitted to an autoclave and retained therein under a controlled pressure to maintain the mass in a mixable condition for such a period of time as will insure thorough mixing. After such a mixing step, the pressure and/or temperature conditions may be adjusted to accelerate the conversion reaction. After the conversion period, the temperature and pressure may be readjusted to permit crystallization and drying of the mass. Or the process may be carried out as explained in application Serial No. 304,789, by compounding streams of acid and dust of predetermined quantities in a compounding stage and then passing the mixture to the receiving stage or autoclave. With such a process, the reactions may be accelerated by utilizing preheated acid or dust. During the charging step, the autoclave may be maintained under a slight vacuum to eliminate any back pressure on the charge. By proper regulation of the conditions of charging, as explained more fully in the copending application Serial No. 393,826 filed September 19, 1929, a ten ton autoclave may be charged in three minutes or less.

After the mass is deposited in the autoclave, it is retained therein under controlled conditions of temperature or pressure for a period which may vary from ten to thirty minutes, depending upon such factors as the strength and temperature of the acid, the temperature and pressure in the receiving stage, the fineness of dust, etc.

Upon the completion of the conversion stage, the conditions within the autoclave may then be adjusted to insure the drying of the product. Extensive experiments have shown that the character of the product is markedly influenced by the conditions which obtain during this drying period. It further appears that considerably more than the mere withdrawal of water is involved, because it has been found that if the drying is carried out under carefully regulated conditions, not only may the water content be lowered to the desired degree, but the acidulation of the product may be increased. For this reason, this step appears to be and is designated vacuum curing.

Briefly considered, this treatment comprises submitting the converted material to such conditions of temperature and pressure as will insure a controlled recession of temperature. Experiments appear to indicate that this treatment performs two functions; the first is the withdrawal of water and the second is the concentration of the residual acidifying solution. The then concentrated acidifying agents have an opportunity to react with any unattacked rock to give an increased total acidulation. However, whatever may be the mechanism of the reaction, it is found that by a proper adjustment of the conditions of temperature and pressure, the double advantage of a decrease in moisture content and an increase in acidulation may be obtained. Further, it has been found that for the ordinary ranges of applied vacuum, the temperature conditions are very important and almost critical. Experiments have shown that when employing a medium dust and moderately strong acid, say from 52 to 56° Bé. more or less, and controlling the pressure during the conversion period between twenty-five to fifty pounds while substantially maintaining the exothermic heats, a satisfactorily dried product of increased acidulation may be obtained by heating the material to a temperature equal to that obtained by heating externally with steam under a pressure of thirty pounds, while rotating and vacuumizing. It appears furthermore that the optimum maximum heating conditions are obtained by using steam under twenty pounds of pressure. In these circumstances, five tons of the fertilizer product may be satisfactorily dried in approximately twenty minutes.

With the described vacuum curing step as a contributing cause, it is possible to obtain a dried, cured phosphatic fertilizer product of high acidulation and availability in less than two hours. This, it will be appreciated, compares most favorably with the older den method in which a marketable product (remilled once) could scarcely be obtained in less than three months.

As noted above, no exact statement of the mechanics of these improved results is proposed. It is suggested, however, that it is due possibly to some critical effect of the temperature conditions under which the treatment is effected. This treatment probably results in an increased concentration of the residual acidifying agents, or it may possibly be due to the activity resulting from the expansion and consequent extenuation of the cooled surfaces. Likewise it may be that the increased acidulation results from the extraction of water from the films of the acidifying agent, leaving concentrates which react further with exposed unattacked particles of the phosphatic material.

Since the improvement in the product is a result of the vacuum curing treatment, it is obvious that the invention is not limited to use with a fertilizer product which has first been prepared by the autoclave method. Obviously, the process herein described is equally applicable for the treatment of a den product. Furthermore, it will be appreciated that the curing method herein described may be employed with an autoclave product which has first been prepared and then placed in storage, that is to say, the efficacy of the process is not limited to its concurrent use in the autoclave apparatus. Therefore, it will be appreciated that although the improved curing and/or drying method has been illustrated by definite conditions, the broader conception is not limited to these, as such conditions will vary somewhat with a variation in the other factors involved in the whole process. Hence, all such regulatory variations, together with equivalent methods of procedure, are considered to be comprehended in the appended claims.

I claim:

1. A method of preparing phosphatic fertilizer comprising treating insoluble phosphatic material with an acid of a concentration of 52 to 56° Bé. at a pressure between 25 and 50 pounds per square inch, maintaining exothermic heats within the reacting mass, reducing the pressure on the reaction mass and heating the same to a temperature equal to that obtained by heating with steam under a pressure of 20 pounds.

2. A method of preparing phosphatic fertilizer comprising treating insoluble phosphatic material with an acid of a concentration of 52 to 56° Bé. at a pressure between 25 and 50 pounds per square inch, maintaining exothermic heats within the reacting mass, reducing the pressure on the reaction mass and heating the same to a temperature equal to that obtained by heating with steam under a pressure of 30 pounds.

In testimony whereof I affix my signature.

DAVID L. ANDERSON.